United States Patent
Ullrich et al.

(10) Patent No.: US 12,509,045 B2
(45) Date of Patent: Dec. 30, 2025

(54) BRAKE SYSTEM FOR A MOTOR VEHICLE

(71) Applicant: Continental Automotive Technologies GmbH, Hannover (DE)

(72) Inventors: Thorsten Ullrich, Gernsheim (DE); Robert Bachmann, Alzenau (DE); Martin Baechle, Kelkheim (DE); Roman Büchler, Frankfurt (DE)

(73) Assignee: Continental Automotive Technologies GmbH, Frankfurt am Main (DE)

( * ) Notice: Subject to any disclaimer, the term of this patent is extended or adjusted under 35 U.S.C. 154(b) by 201 days.

(21) Appl. No.: 18/573,163

(22) PCT Filed: Jun. 2, 2022

(86) PCT No.: PCT/DE2022/200106
§ 371 (c)(1),
(2) Date: Dec. 21, 2023

(87) PCT Pub. No.: WO2022/268267
PCT Pub. Date: Dec. 29, 2022

(65) Prior Publication Data
US 2024/0286595 A1    Aug. 29, 2024

(30) Foreign Application Priority Data
Jun. 23, 2021    (DE) ................ 10 2021 206 497.3

(51) Int. Cl.
*B60T 13/66*    (2006.01)
*B60T 13/68*    (2006.01)
(Continued)

(52) U.S. Cl.
CPC .......... *B60T 13/745* (2013.01); *B60T 13/662* (2013.01); *B60T 13/686* (2013.01); *B60T 17/22* (2013.01);
(Continued)

(58) Field of Classification Search
CPC .... B60T 13/745; B60T 13/662; B60T 13/686; B60T 2220/04; B60T 2270/413; B60T 2270/402; B60T 17/22
See application file for complete search history.

(56) References Cited

U.S. PATENT DOCUMENTS

2010/0241330 A1    9/2010    Hartmann et al.
2011/0144878 A1*   6/2011    Schneider ............... B60T 13/00
                                                                701/70
(Continued)

FOREIGN PATENT DOCUMENTS

DE            10319194  B3    9/2004
DE       102012020421  A1    4/2014
(Continued)

OTHER PUBLICATIONS

International Search Report and Written Opinion dated Sep. 30, 2022 from corresponding International patent application No. PCT/DE2022/200106.
(Continued)

*Primary Examiner* — Jacob M Amick

(57) ABSTRACT

A brake system for a motor vehicle includes an electrohydraulic partial brake system with hydraulically actuated wheel brakes and an electromechanical partial brake system with electromechanically actuated wheel brakes. The brake system includes two control units and two energy supplies which are independent of one another, a first one of the control units being configured to control the electromechanical partial brake system, and a second one of the control units being configured to control the electrohydraulic partial brake system. The first control unit is supplied with energy exclusively by way of a first one of the energy supplies and the second control unit is supplied with energy exclusively by way of a second one of the energy supplies.

13 Claims, 2 Drawing Sheets

(51) Int. Cl.
   *B60T 13/74* (2006.01)
   *B60T 17/22* (2006.01)
(52) U.S. Cl.
   CPC ..... *B60T 2220/04* (2013.01); *B60T 2270/402* (2013.01)

(56) References Cited

U.S. PATENT DOCUMENTS

| | | | |
|---|---|---|---|
| 2011/0168502 A1* | 7/2011 | Linhoff | B60T 13/588 |
| | | | 303/3 |
| 2017/0072920 A1 | 3/2017 | Besier et al. | |
| 2022/0169222 A1* | 6/2022 | Ullrich | B60Q 9/00 |
| 2023/0391303 A1* | 12/2023 | Kim | B60T 8/92 |

FOREIGN PATENT DOCUMENTS

| | | |
|---|---|---|
| DE | 102012217825 A1 | 4/2014 |
| DE | 102015206572 A1 | 11/2015 |
| JP | 2002067909 A | 3/2002 |
| JP | 2005001661 A | 1/2005 |
| JP | 2006081903 A | 3/2006 |
| KR | 20130133191 A | 12/2013 |
| WO | 2010034676 A1 | 4/2010 |
| WO | 2014048600 A1 | 4/2014 |
| WO | 2020207871 A1 | 10/2020 |

OTHER PUBLICATIONS

Search Report dated Feb. 2, 2023 from corresponding German patent application No. 10 2022 205 649.3.
Decision to Grant issued on Mar. 26, 2025 from corresponding Japanese patent application No. 2023-574209.
Audit Notice issued on Dec. 13, 2024 from corresponding Japanese patent application No. 2023-574209.
Notice of Preliminary Rejection issued on Jan. 20, 2025 from corresponding Korean patent application No. 10-2023-7039808.

* cited by examiner

BRAKE SYSTEM FOR A MOTOR VEHICLE

CROSS-REFERENCE TO RELATED APPLICATIONS

This application is a national stage application, filed under 35 U.S.C. § 371, of international patent application No. PCT/DE2022/200106, filed on Jun. 2, 2022, which claims priority to German patent application No. 10 2021 206 497.3, filed Jun. 23, 2021, each of which is incorporated by reference herein.

TECHNICAL FIELD

The technical field relates to a brake system for a motor vehicle.

BACKGROUND

In the prior art, brake systems with an electrohydraulic partial brake system and an electromechanical partial brake system are known. Here, the two systems are usually controlled by one control unit, the control unit usually being assigned to the electrohydraulic partial brake system. Here, the electrohydraulic partial brake system usually has a hydraulic fallback level which makes a retardation of the vehicle by way of the hydraulic partial brake system possible even in the case of a failure of the control unit.

In a system of this type, there are a high number of possible faults which lead to a loss of the complete electric boosting of the brake action. This applies both to the electrohydraulic partial brake system and to the electromechanical partial brake system.

In contrast, the present application is based on the object of specifying a brake system which provides a reduction in the fault probability for a complete loss of the electric boosting of the brake action as a result of an electric fault, and a high brake performance in the case of electric individual faults.

SUMMARY

The disclosure relates to a brake system for a motor vehicle with an electrohydraulic partial brake system with hydraulically actuated wheel brakes and an electromechanical partial brake system with electromechanically actuated wheel brakes. Here, the brake system has two control units and two energy supplies which are independent of one another, a first one of the control units being configured to control the electromechanical partial brake system, and a second one of the control units being configured to control the electrohydraulic partial brake system. The first control unit is supplied with energy exclusively by way of a first one of the energy supplies, and the second control unit is supplied with energy exclusively by way of a second one of the energy supplies. Here, the first control unit is connected via a primary communications bus to the electromechanically actuated wheel brakes, and the second control unit is connected via a secondary communications bus to the electromechanically actuated wheel brakes, the first control unit being configured to transmit control information, in particular setpoint brake forces to be applied by way of the electromechanical wheel brakes, via the primary communications bus to the electromechanically actuated wheel brakes, the second control unit being configured to transfer actuating information of the electrohydraulic partial brake system, in particular a pedal travel or pedal angle of an actuating pedal and/or a force acting on the actuating pedal and/or a displacement travel of a cylinder piston arranged in the master cylinder, via the secondary communications bus to the electromechanically actuated wheel brakes. The electromechanical wheel brakes each have wheel control units, the wheel control units being configured to control a brake force which is applied by way of the respective electromechanical wheel brake in a manner which is dependent on an information item, in particular a control information item or an actuating information item, received via the primary and/or secondary communications bus.

Accordingly, the control unit of the brake system is split into a first control unit and a second control unit. Here, the first control unit and the second control unit each control a part of the electrohydraulic partial brake system. Furthermore, the first control unit and the second control unit communicate via a separate bus with the electromechanical partial brake system. Here, the first control unit is configured to exchange information with the second control unit. This can be, in particular, actuating information, prevailing brake pressures or brake forces, or further operating information of the respective partial brake system.

High brake performance can thus be ensured in the case of electric individual faults, since the electrohydraulic and the electromechanical partial brake system can each be actuated by the still functional control unit even in the case of a failure of one of the control units, in such a way as to guarantee the provision of a minimum retardation by way of the brake system. Here, an "individual fault" is to be understood to mean a malfunction of an element of the brake system, that is to say, for example, of an energy supply or a control unit.

Here, the hydraulic partial brake system has precisely two hydraulically actuated wheel brakes, the hydraulically actuated wheel brakes being configured to load the wheels of a front axle of the motor vehicle with a brake force.

Correspondingly, the electromechanical partial brake system may include precisely two electromechanically actuated wheel brakes, the electromechanically actuated wheel brakes particularly being configured to load those vehicle wheels of the vehicle which are assigned to the electromechanically actuated wheel brakes, in particular the vehicle wheels of a rear axle of the motor vehicle, with a brake force in a manner which is dependent on a received information item, in particular a control information item, in particular a setpoint brake force.

Accordingly, the brake system is configured with a distribution by axle of the electromechanical and electrohydraulic wheel brakes, a main brunt of the retardation usually being borne by way of the electrohydraulically actuated wheel brakes of the front axle.

The electromechanically actuated wheel brakes can be, for example, disk brakes or electromechanical drum brakes. Here, furthermore, the electromechanically actuated wheel brakes are configured to implement a parking brake function. Here, the first control unit is particularly configured to activate the parking brake function of the electromechanically actuated wheel brakes.

It is provided in accordance with one embodiment that the electrohydraulic partial brake system has an electromechanical pressure provision device for generating a hydraulic brake pressure, the second control unit being configured to actuate the electromechanical pressure provision device in order to generate a hydraulic brake pressure by way of the electromechanical pressure provision device. The electromechanical pressure provision device may be, for example, what is known as a linear actuator. Here, a drive shaft of an electric motor drive is connected to a rotational/translation gear mechanism in such a way that a rotation of the drive shaft is converted into a translation of a pressure piston. The pressure piston is arranged in a pressure cylinder and is configured to displace a fluid situated in the pressure cylinder, in particular brake fluid, out of the pressure cylinder and/or to load it with a pressure. In a normal operating type of the electrohydraulic partial brake system, a hydraulic pressure for generating a brake force by way of the hydraulically actuated wheel brakes is generated here exclusively by way of the electromechanical pressure provision device.

In order to ensure control of the pressure provision device by way of the second control unit, it is provided here that the second control unit has an electronic power system for providing an operating voltage for the electromechanical pressure provision device. The energy supply of the electronic power system and, as a consequence, the pressure provision device is accordingly likewise ensured by way of the second energy supply.

It is provided here in accordance with a further embodiment that the electrohydraulic partial brake system has a pressure feed valve, the pressure feed valve being configured to establish or to disconnect a hydraulic connection between the electromechanical pressure provision device and the hydraulically actuated wheel brakes. Here, the pressure feed valve is normally closed. Accordingly, in the case of a failure of the current supply of the pressure feed valve, a hydraulic connection between the electromechanical pressure provision device and the hydraulically actuated wheel brakes would be interrupted.

It is provided in accordance with a further embodiment that the electrohydraulic partial brake system has a hydraulic master cylinder, it being possible for the master cylinder to be loaded with a hydraulic pressure by way of an actuating pedal, the electrohydraulic partial brake system having a master cylinder valve, the master cylinder valve being configured to establish or to disconnect a hydraulic connection between the master cylinder and the hydraulically actuated wheel brakes. The master cylinder valve in this embodiment is normally open, with the result that, in the case of a failure of the energy supply of the master cylinder valve, a hydraulic connection between the master cylinder and the hydraulically actuated wheel brakes is automatically established. In this way, a direct actuation of the hydraulically actuated wheel brakes by way of the actuating pedal and the master cylinder continues to remain possible even in the case of a corresponding individual fault.

As has already been stated above, it is provided in normal operation of the brake system that a hydraulic pressure for actuating the electrohydraulically actuated wheel brakes is generated exclusively by way of the electromechanical pressure provision device. Here, the master cylinder is correspondingly disconnected hydraulically from the wheel brakes. In order to also continue to impart a usual actuating feel to the vehicle driver in the case of an actuation of the actuating pedal or brake pedal, it is provided in accordance with a further embodiment that the electrohydraulic partial brake system has a pedal feel simulator, it being possible for the pedal feel simulator to be connected hydraulically to the master cylinder, the electrohydraulic partial brake system having a simulator valve, the simulator valve being configured to establish or to disconnect a hydraulic connection between the master cylinder and the pedal feel simulator. Here, the simulator valve is normally closed, with the result that, in the case of a malfunction, the master cylinder is decoupled from the pedal feel simulator, and the hydraulic pressure which is generated in the master cylinder can act completely on the wheel brakes.

As has already been stated above, it is provided that each control unit in each case may control a part of the electrohydraulic partial brake system, with the result that, in the case of a failure of one of the control units or an associated energy supply, a retardation by way of the hydraulic partial brake system continues to remain possible. Accordingly, it is provided in accordance with one embodiment that the second control unit is configured to control the electromechanical pressure provision device, the simulator valve, the master cylinder valve and the pressure feed valve.

Furthermore, it is provided in accordance with a further embodiment that the electrohydraulic partial brake system has a first pressure sensor for determining a hydraulic pressure generated by way of the master cylinder and/or a motor position sensor for determining a motor position of a drive of the electromechanical pressure provision device and/or a displacement sensor for determining a displacement travel of a cylinder piston in the master cylinder. In this case, the second control unit is configured to read out information determined by way of the pressure sensor and/or information determined by way of the motor position sensor and/or information determined by way of the displacement sensor. This information can then either be transferred in the form of actuating information to the electromechanically actuated wheel brakes, or can be communicated to the first control unit.

In addition to a transfer of the information determined in this way to the electromechanical partial brake system, it is provided in accordance with a further embodiment, furthermore, that the second control unit is configured to actuate the electromechanical pressure provision device in order to generate a hydraulic brake pressure by way of the electromechanical pressure provision device in a manner which is dependent on a determined displacement travel of the cylinder piston in the master cylinder and/or in a manner which is dependent on a hydraulic pressure generated by way of the master cylinder and/or in a manner which is dependent on an actuating angle of the actuating pedal and/or in a manner which is dependent on an actuating travel of the actuating pedal and/or in a manner which is dependent on a force which acts on the actuating pedal. Here, an actuating angle or an actuating travel of the actuating pedal or a force which acts on the actuating pedal can also be used as actuating information for controlling the electromechanical wheel brakes.

For adapting a brake pressure which prevails at the hydraulically actuated wheel brakes in a wheel-individual manner, for example in order to implement an ABS function, it is provided in accordance with a further embodiment that the electrohydraulic partial brake system has a pressure modulation apparatus, the pressure modulation apparatus being configured to modulate the hydraulic brake pressure prevailing at the hydraulically actuated wheel brakes, in particular in a wheel-individual manner, the first control unit being configured to control the pressure modulation apparatus.

It is particularly provided here that, per hydraulically actuated wheel brake, the electrohydraulic partial brake system may have a normally open inlet valve and a normally closed outlet valve, the inlet valves and outlet valves forming the pressure modulation apparatus. Here, the inlet valves are each configured to establish or to disconnect a hydraulic connection between the respective wheel brake and the electromechanical pressure provision means and/or the master cylinder, while the outlet valves are each configured to establish or to disconnect a hydraulic connection between the respective wheel brake and a brake fluid reservoir. Here, the brake fluid reservoir is under atmospheric pressure. The first control unit is correspondingly configured to control the inlet valves and/or the outlet valves of the electrohydraulic partial brake system.

Furthermore, it is provided in accordance with a further embodiment that the electromechanically actuated wheel brakes are supplied with energy by the first energy supply. In accordance with this embodiment, the electromechanical wheel brakes are therefore supplied with energy by the same energy supply which also supplies the control unit which is assigned primarily to the electromechanical wheel brakes with energy.

It has already been stated above that the electromechanical wheel brakes are actuated on the basis of control information which, in particular, identifies a wheel brake setpoint brake force which is to be applied by way of the respective wheel brake. To this end, it is provided in accordance with a further embodiment that the first control unit is configured to determine setpoint brake forces to be applied by way of the electromechanically actuated wheel brakes in a manner which is dependent on a determined displacement travel of the cylinder piston in the master cylinder and/or in a manner which is dependent on a hydraulic pressure generated by way of the master cylinder and/or in a manner which is dependent on an actuating angle of the actuating pedal and/or in a manner which is dependent on an actuating travel of the actuating pedal and/or in a manner which is dependent on a force which acts on the actuating pedal.

Furthermore, a brake system as claimed in one of the preceding claims is provided in accordance with a further embodiment, the brake system having wheel rotational speed sensors, the first control unit being configured to modulate the brake forces prevailing at the vehicle wheels on the basis of the wheel rotational speeds. It can be provided here, in particular, that a driving function, in particular an ABS function or an ESC function, is realized by way of the modulation of the brake forces which prevail at the vehicle wheels, in particular by way of a corresponding change in the brake application force of the electromechanically actuated wheel brakes or the hydraulic pressure in the hydraulically actuated wheel brakes.

It is provided here that the electrohydraulic partial brake system has a pilot pressure sensor for determining a hydraulic pressure which prevails upstream of the inlet valves of the wheel brakes, the first control unit being configured to read out information determined by way of the pilot pressure sensor. Proceeding from a pilot pressure of this type, the retardation behavior of the hydraulically actuated wheel brakes can then be controlled in order to implement an ABS or ESC function by way of targeted opening and closing of the inlet and outlet valves.

In addition to an activation of the brake system by way of an actuation of the brake pedal or actuating pedal, it can be provided, furthermore, that the brake system is activated autonomously by way of a driving function of the vehicle, without a vehicle driver actively influencing this. To this end, it is provided in accordance with a further embodiment that the first control unit is connected to a vehicle bus of the motor vehicle, it being possible for control commands, in particular brake requests, to be transmitted to the first control unit via the vehicle bus. Brake requests of this type can be triggered, for example, within the context of Active Cruise Control or an ESC function.

BRIEF DESCRIPTION OF THE DRAWINGS

In the following text, refinements of the disclosure will be explained in greater detail on the basis of the drawings, in which.

DETAILED DESCRIPTION

Features that are similar or identical to each other are denoted below by the same designations.

Figure 1:
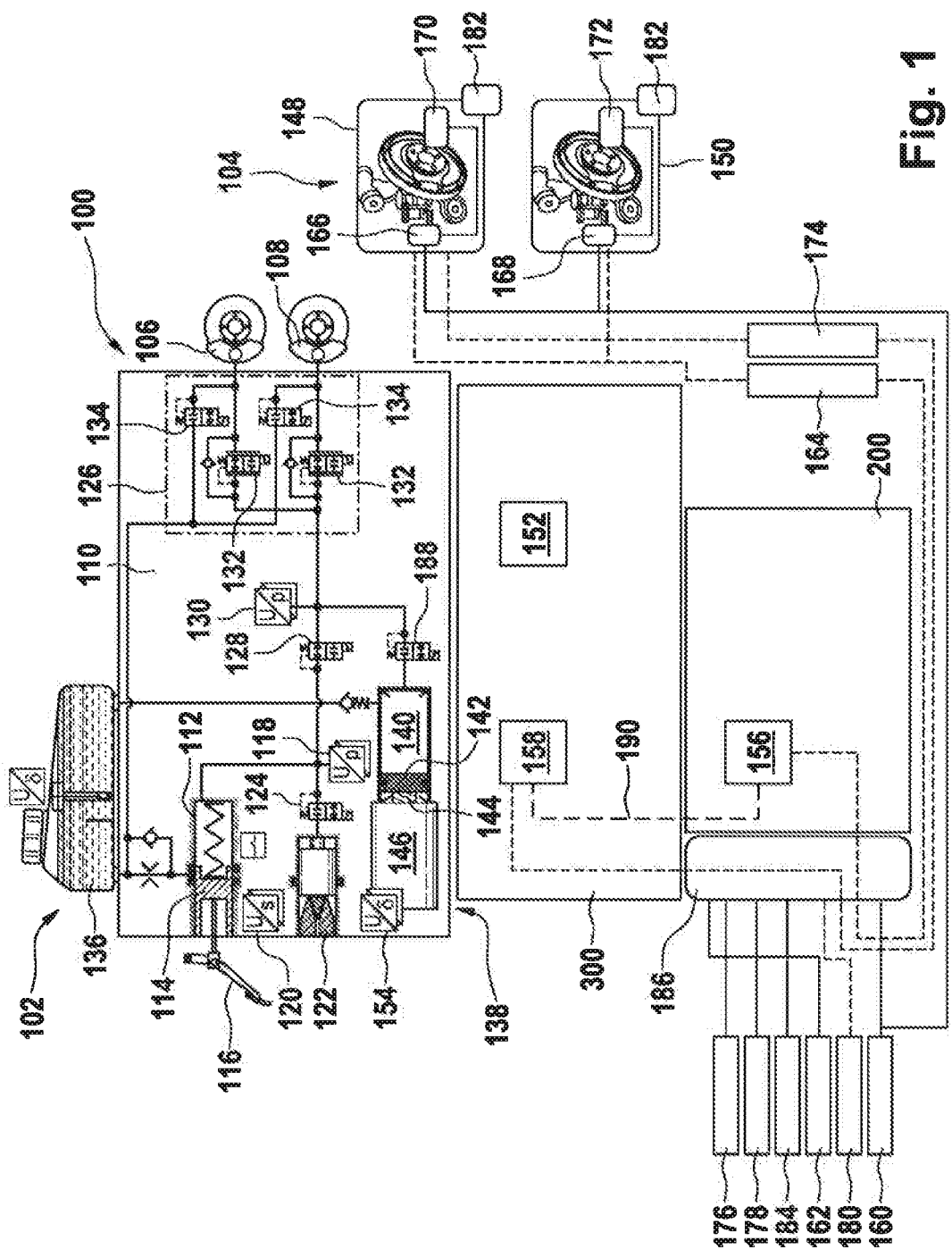
FIG. 1 shows a diagrammatic illustration of an exemplary brake system.

FIG. 1 shows a brake system 100 for a motor vehicle with a hydraulic partial brake system 102 and an electromechanical partial brake system 104. Here, the electrohydraulic partial brake system 102 has hydraulically actuated wheel brakes 106 and 108 which act on the front wheels of a motor vehicle. The wheel brakes 106 and 108 can be, in particular, hydraulically actuated disk brakes. Here, during active operation of the brake system 100, the wheel brakes 106 and 108 are loaded by way of a hydraulic arrangement 110 with a hydraulic brake pressure which is converted by way of the wheel brakes 106 and 108 into a brake force which acts on the vehicle wheels assigned in each case to the wheel brakes 106 and 108.

To this end, the hydraulic arrangement 110 has a master cylinder 112 with a cylinder piston 114 which is mounted displaceably in the master cylinder 112. Here, the cylinder piston 114 can be displaced in the master cylinder 112 by way of actuation of an actuating pedal 116 which is connected to the cylinder piston 114, or a brake fluid which is situated in the master cylinder 112 can be loaded with a hydraulic pressure. The hydraulic pressure which is generated here is detected by way of a pressure sensor 118. Furthermore, the displacement travel of the cylinder piston 114 is determined by way of a displacement sensor 120.

The master cylinder 112 is connected hydraulically first of all to a pedal feel simulator 122, a normally closed simulator valve 124 being arranged between the master cylinder 112 and the pedal feel simulator 122. Accordingly, a hydraulic connection between the master cylinder 112 and the pedal feel simulator 122 can be established or interrupted by way of the simulator valve 124.

Furthermore, the master cylinder 112 is connected hydraulically to a pressure modulation apparatus 126, the pressure modulation apparatus 126 in turn being connected hydraulically to the wheel brakes 106 and 108. Here, a normally open master cylinder valve 128 is arranged between the master cylinder 112 and the pressure modulation apparatus 126, it being possible for a hydraulic connection between the master cylinder 112 and the pressure modulation apparatus 126 to be established or interrupted by way of the master cylinder valve 128. Furthermore, a pilot pressure sensor 130 is arranged between the master cylinder valve 128 and the pressure modulation apparatus 126, the pilot pressure sensor 130 being configured to determine a hydraulic pressure which prevails upstream of the pressure modulation apparatus 126.

Per connected hydraulically actuated wheel brake 106 and 108, the pressure modulation apparatus 126 has a normally open inlet valve 132 and a normally closed outlet valve 134. Here, the outlet valves 134 are configured to establish or to interrupt a hydraulic connection between the wheel brakes 106 and 108 and a brake fluid reservoir 136, with the result that a hydraulic brake pressure which prevails in the wheel brakes 106 and 108 can be reduced via the outlet valves 134. At the same time, the hydraulic brake pressure which prevails in the wheel brakes 106 and 108 can be modulated, starting from the prevailing pilot pressure, by way of targeted opening and closing of the inlet valves 132.

Furthermore, the hydraulic arrangement 110 has an electromechanical pressure provision device 138. Here, the pressure provision device 138 has a hydraulic cylinder 140 and a pressure piston 142 which can be displaced in the hydraulic cylinder 140. The pressure piston 142 is connected to a spindle drive 144 which is driven by electric motor, in such a way that a rotation of a drive shaft of the drive or electric motor 146 which is connected to the spindle drive 144 is converted into a translational movement of the pressure piston 142 in the hydraulic cylinder 140, as a result of which a brake fluid which is situated in the hydraulic cylinder can be loaded with a pressure. The rotational position of a rotor of the electric motor 146 and, as a consequence, the current position of the pressure piston 142 in the hydraulic cylinder is monitored by way of a motor position sensor 154.

Here, the hydraulic cylinder 140 of the pressure provision device 138 is likewise connected hydraulically to the pressure modulation apparatus 126, a normally closed pressure feed valve 188 being arranged between the pressure modulation apparatus 126 and the hydraulic cylinder 140 of the pressure provision device 138. Accordingly, a hydraulic connection between the pressure provision device 138 and the pressure modulation apparatus 126 can be established or interrupted by way of the pressure feed valve 188.

In the embodiment which is shown, the electromechanical partial brake system 104 has two electromechanically actuated wheel brakes 148 and 150 which are configured as electromechanical drum brakes. Here, the wheel brakes 148 and 150 are assigned to the vehicle wheels of the rear axle of the vehicle. Furthermore, the wheel brakes 148 and 150 are configured to implement a parking brake function.

The brake system 100 has two control units 200 and 300, the control units 200 and 300 being configured in the embodiment which is shown as part of the electrohydraulic partial brake system 102. Here, a first control unit 200 is configured to control the pressure modulation apparatus 126, that is to say in particular the inlet valves 132 and the outlet valves 134, in order to modulate the hydraulic brake pressure which prevails at the wheel brakes 106 and 108, starting from a hydraulic pilot pressure which prevails upstream of the pressure modulation apparatus 126. In this way, in particular, an ABS control operation or an ESC control operation can be implemented by way of the first control unit 200. Furthermore, the first control unit 200 is configured to read out a hydraulic pressure which is determined by way of the pilot pressure sensor 130.

Here, the second control unit 300 is configured to control the pressure provision device 138, the simulator valve 124, the master cylinder valve 128 and the pressure feed valve 188. Furthermore, the second control unit 300 has an electronic power system 152 for providing and controlling an operating voltage for the electromechanical pressure provision device 138 or the corresponding electric motor 146. The second control unit 300 is configured to read out a displacement travel of the cylinder piston 114 which is determined by way of the displacement sensor 120, a pressure which is determined by way of the pressure sensor 118 and is generated by way of the master cylinder 112, and a motor position of the electric motor 146 which is detected by way of the motor position sensor 154.

The first control unit 200 has a first microcontroller 156, while the second control unit 300 has a second microcontroller 158 for implementing the control functions of the respective control unit 200 and 300, respectively. Here, the microcontrollers 156 and 158 are connected to one another via a communications connection 190, with the result that control information can be swapped between the microcontrollers 156 and 158 and, as a consequence, between the control units 200 and 300.

In order to control the electromechanically actuated wheel brakes 148 and 150, the first control unit 200 is connected via a common primary communications bus 164 to the electromechanically actuated wheel brakes 148 and 150 or to the control units 166 and 168 which are contained in the electromechanically actuated wheel brakes 148 and 150. Here, the first control unit 200 is configured to transmit control information, in particular setpoint brake forces to be applied by way of the wheel brakes 148 and 150, via this primary communications bus 164 to the control units 166 and 168. The control units 166 and 168 are then configured to adjust the brake force of the respective wheel brake 148 and 150 to the corresponding setpoint brake force with the aid of torque sensors 170 and 172 which are arranged in the wheel brakes.

The second control unit 300 is likewise connected to the electromechanically actuated wheel brakes 148 and 150 via a common secondary communications bus 174, and is configured, in a fallback level type, to transmit control information to the control units 166 and 168 of the electromechanically actuated wheel brakes 148 and 150. This will be described in greater detail in the following text.

Furthermore, the brake system which is shown has a first energy supply 160 and a second energy supply 162. Here, the first energy supply 160 is completely independent of the second energy supply 162. In particular, the first energy supply 160 and the second energy supply 162 can be two on-board electric systems which are separate from one another and, in particular, are configured in such a way that a failure or a malfunction of one of the on-board electric systems does not influence the functional capability of the respectively other on-board electric system.

Here, the first energy supply 160 is configured to supply the first control unit 200 and the electromechanically actuated wheel brakes 148 and 150 with energy, while the second energy supply 162 is configured to supply the second control unit 300 and, as a consequence, also the electromechanical pressure provision device 138 via the electronic power system 152 with energy.

Here, furthermore, the first control unit 200 is connected to a parking brake switch 176, with the result that, upon actuation of the parking brake switch 176, a corresponding information item can be processed by way of the first control unit 200. The first control unit 200 is then configured to transmit a corresponding control information item for activating the parking brake function to the electromechanical wheel brakes 148 and 150 via the primary communications bus 164, with the result that the parking brake function is activated by way of the control units 166 and 168 of the wheel brakes 148 and 150.

In addition, the first control unit 200 is connected to an ESC switch 178, by way of which the ESC functionality of the brake system 100 can be activated or deactivated. Furthermore, the first control unit 200 is connected to a vehicle bus 180, it being possible for control information, in particular in the form of brake requests, to likewise be received via the vehicle bus 180. Brake requests of this type can be triggered, for example, within the context of an automated driving function, for example an autopilot.

In order to provide control functions such as ABS and ESC by way of the first control unit 200, furthermore, the brake system 100 has wheel rotational speed sensors 182 which are assigned to those vehicle wheels which can be loaded with a brake force by way of one of the wheel brakes 106, 108, 148 or 150. Here, wheel rotational speed information of those vehicle wheels to which the hydraulically actuated wheel brakes 106 and 108 are assigned is transmitted via a corresponding interface 184 to the first control unit 200, while the wheel rotational speed information of those vehicle wheels to which the electromechanically actuated wheel brakes 148 and 150 are assigned is transferred via the primary communications bus 164 to the first control unit 200.

Here, the attachment of the first energy supply 160, the second energy supply 162, the wheel rotational speed sensors 182 of the front wheels, the parking brake switch 176, the ESC switch 178, the vehicle bus 180, the primary communications bus 164 and the secondary communications bus 174 to the control units 200 and 300 of the brake system 100 is realized via a common interface 186 which can be configured, in particular, as part of the first control unit 200.

The method of operation of the brake system 100 will be described in the following text. It is provided here in a normal operating type of the brake system 100 that the master cylinder 112 is decoupled from the hydraulically actuated wheel brakes 106 and 108 by way of a closed master cylinder valve 128, with the result that a hydraulic pressure which is built up by way of actuation of the actuating pedal 116 is received by way of the pedal feel simulator 122. To this end, the simulator valve 124 is opened in the normal operating type. The pressure which is generated here is detected by way of the pressure sensor 118, while at the same time the displacement travel of the cylinder piston 114 is detected by way of the displacement sensor 120. Furthermore, an actuating travel or an actuating angle of the actuating pedal or an actuating force which acts on the actuating pedal 116 can also be determined as actuating information.

The actuating information detected in this way is read out by way of the second control unit 300 and interpreted as a brake request. On the basis of this brake request, the second control unit 300 actuates the pressure provision device 138 by means of the electronic power system 152 in such a way that a hydraulic brake pressure which corresponds to the brake request is generated in the hydraulic cylinder 140 of the pressure provision device 138 and, as a consequence, in the wheel brakes 106 and 108, with the result that the desired brake force is generated by way of the wheel brakes 106 and 108. This brake pressure is detected by way of the pilot pressure sensor 128 and is read out by way of the first control unit 200.

Here, the first control unit 200 is configured to determine a setpoint brake force on the basis of the determined brake pressure and/or on the basis of actuating information which is transmitted by the second control unit 300 to the first control unit 200, which setpoint brake force is to be applied by way of the electromechanically actuated wheel brakes 148 and 150 in order to implement the brake request. Here, a fixed or dynamically variable brake force distribution between the wheel brakes 106 and 108 of the front axle and the wheel brakes 148 and 150 of the rear axle can be taken into consideration.

The setpoint brake force which is determined in this way is then transmitted from the first control unit 200 via the primary communications bus 164 to the control units 166 and 168 of the wheel brakes 148 and 150, whereupon the control units 166 and 168 correspondingly adjust the brake force which is applied by way of the wheel brakes 148 and 150.

In a way which is analogous to this, a brake request or a brake command can also be implemented which has been received via the vehicle bus 180.

Here, during the retardation operation, the wheel rotational speeds of the vehicle wheels are monitored permanently by way of the first control unit 200 as to whether the slip of at least one of the vehicle wheels exceeds a defined limit value. If this is the case at a vehicle wheel of the rear axle, the setpoint brake force of the corresponding wheel brake 148 or 150 is adapted by way of the first control unit 200, with the result that the slip is adjusted again to a permissible magnitude. If slip is detected at a vehicle wheel of the front axle, the first control unit 200 actuates the pressure modulation apparatus 126 in such a way that the brake pressure in the corresponding wheel brakes 106 or 108 is reduced briefly, for example, by way of temporally limited opening of the corresponding outlet valves 134, in such a way that the slip returns again to a permissible value.

Furthermore, targeted braking of individual vehicle wheels as a consequence of a control request of an ESC controller can also be triggered in the described way by way of the first control unit 200.

In the described brake system 100, parts of the brake system 100 can no longer be used to the desired extent as a result of a multiplicity of electric faults. In the following text, four exemplary cases of faults of this type will be described.

In a first scenario, the first control unit 200 can fail on account of an electric defect. In this case, a wheel-individual modulation of the brake forces is no longer possible to the above-described extent. A fault of this type can be signaled to the vehicle driver by way of illumination of a corresponding warning light.

Apart from a modulation of the brake pressures which prevail at the individual wheel brakes 106 and 108, the hydraulic partial brake system 102 can still be operated normally, however, with the result that electric boosting of the brake force is also still possible. In this case, the electromechanical wheel brakes 148 and 150 of the rear axle can still be actuated by way of the second control unit 300. It is provided to this end that, in the case of failure of the first control unit 200, the second control unit 300 transmits the determined actuating information via the secondary communications bus 174 to the control units 166 and 168. The control units 166 and 168 are then configured to locally adjust the brake force of the corresponding wheel brake 148 and 150 on the basis of this actuating information. It can be provided here, furthermore, that the wheel brakes 148 and 150 swap the respectively determined wheel rotational speeds among one another, with the result that local control of the wheel slip remains possible.

In a second scenario, the second control unit 300 can fail on account of a technical defect, with the result that electric boosting of the hydraulic brake pressure by way of the pressure provision device 138 is no longer possible. Here, the simulator valve 124 and the pressure feed valve 188 are automatically closed, while the master cylinder valve 128 opens. In this case, as a consequence, the master cylinder 112 is connected directly to the wheel brakes 106 and 108, with the result that an actuating force which acts on the actuating pedal 116 is converted directly into a brake pressure which prevails at the wheel brakes 106 and 108. Furthermore, this brake pressure is detected by means of the pilot pressure sensor 130, whereupon the first control unit 200 correspondingly actuates the electromechanically actuated wheel brakes 148 and 150. It can be provided here, furthermore, that the first control unit 200 also has, furthermore, access to the actuating information of the actuating pedal 116 and/or the master cylinder 112. As a consequence, although electric boosting of the brake force at the wheel brakes 106 and 108 of the front wheels is no longer possible in this fallback operating type, the rear axle of the vehicle can still be loaded with the maximum possible brake force, with the result that a sufficient retardation of the vehicle still remains possible.

A scenario which is analogous to this results in the case of failure of the second energy supply 162.

In the case of failure of the first energy supply 160, in contrast, use of the wheel brakes 148 and 150 of the rear axle is no longer possible. In this case, however, the wheel brakes 106 and 108 of the front axle can still be operated with electric boosting of the brake force, with the result that a sufficiently pronounced retardation of the vehicle can also still be achieved here.

Figure 2:
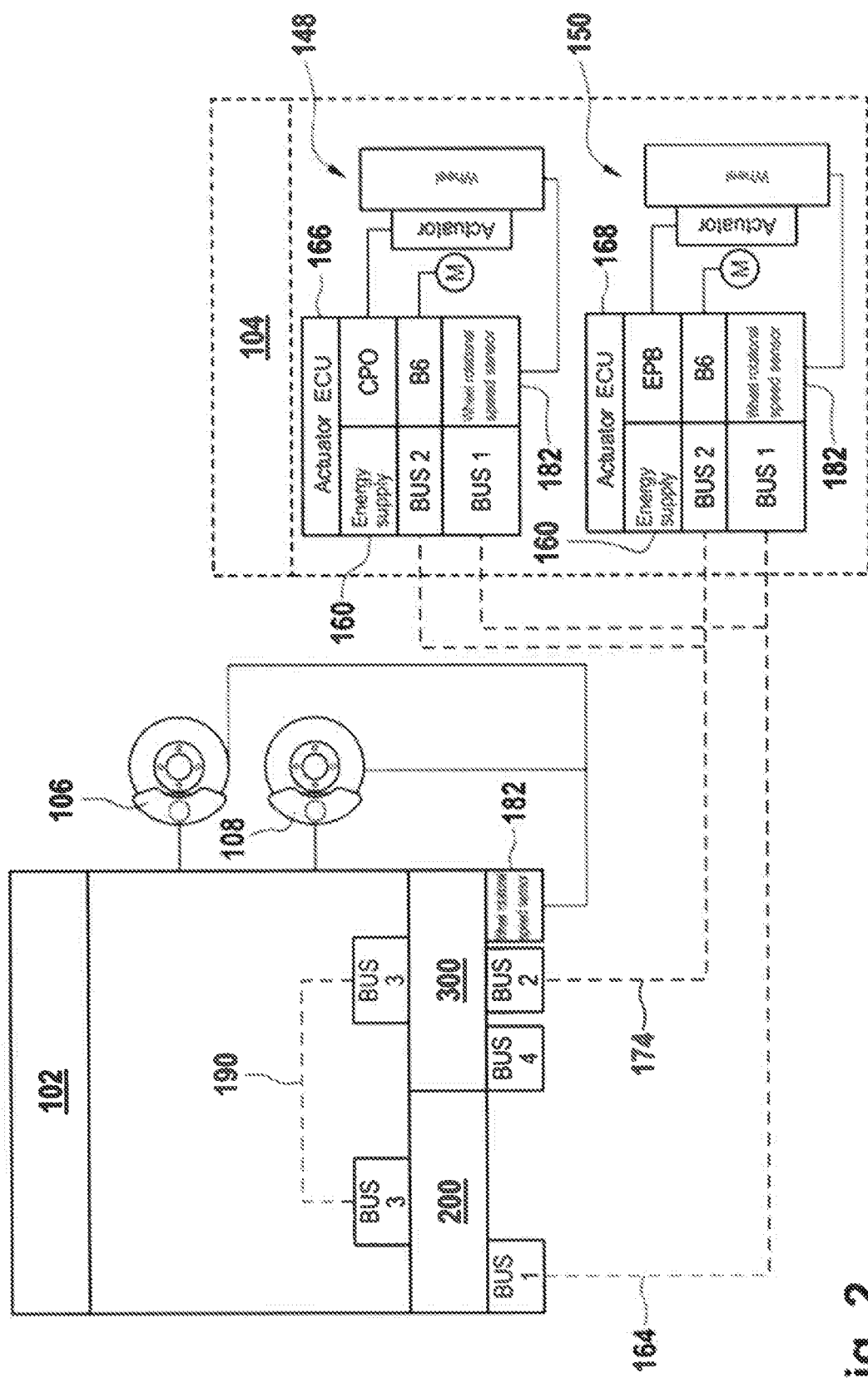
FIG. 2 shows a simplified illustration of the exemplary brake system.

FIG. 2 once again shows a simplified illustration of the brake system 100 which is shown in FIG. 1.

The invention claimed is:

1. A brake system for a motor vehicle with an electrohydraulic partial brake system with hydraulically actuated wheel brakes and an electromechanical partial brake system with electromechanically actuated wheel brakes, the brake system comprising:
   two control units and two energy supplies which are independent of one another,
   a first one of the control units being configured to control the electromechanical partial brake system, and a second one of the control units being configured to control the electrohydraulic partial brake system,
   the first control unit being supplied with energy exclusively by way of a first one of the energy supplies, and the second control unit being supplied with energy exclusively by way of a second one of the energy supplies,
   the first control unit being connected via a primary communications bus to the electromechanically actuated wheel brakes, and the second control unit being connected via a secondary communications bus to the electromechanically actuated wheel brakes,
   the first control unit being configured to transmit control information via the primary communications bus to the electromechanically actuated wheel brakes,
   the second control unit being configured to transfer actuating information of the electrohydraulic partial brake system via the secondary communications bus to the electromechanically actuated wheel brakes,
   the electromechanical wheel brakes each having wheel control units, the wheel control units being configured to control a brake force which is applied by way of the respective electromechanical wheel brake in a manner which is dependent on an information item received via the primary and/or secondary communications bus.

2. The brake system as claimed in claim 1, wherein the electrohydraulic partial brake system includes an electromechanical pressure provision device for generating a hydraulic brake pressure, the second control unit being configured to actuate the electromechanical pressure provision device in order to generate a hydraulic brake pressure by way of the electromechanical pressure provision device.

3. The brake system as claimed in claim 2, the electrohydraulic partial brake system having a pressure feed valve, the pressure feed valve being configured to establish or to disconnect a hydraulic connection between the electromechanical pressure provision device and the hydraulically actuated wheel brakes.

4. The brake system as claimed in claim 3, wherein the electrohydraulic partial brake system includes a hydraulic master cylinder, wherein the master cylinder may be loaded with a hydraulic pressure by way of an actuating pedal, the electrohydraulic partial brake system having a master cylinder valve, the master cylinder valve being configured to establish or to disconnect a hydraulic connection between the master cylinder and the hydraulically actuated wheel brakes.

5. The brake system as claimed in claim 4, wherein the electrohydraulic partial brake system includes a pedal feel simulator, wherein the pedal feel simulator may be connected hydraulically to the master cylinder, the electrohydraulic partial brake system having a simulator valve, the simulator valve being configured to establish or to disconnect a hydraulic connection between the master cylinder and the pedal feel simulator.

6. The brake system (100) as claimed in claim 5, wherein the second control unit is configured to control the electromechanical pressure provision device, the simulator valve, the master cylinder valve and the pressure feed valve.

7. The brake system as claimed in claim 2, wherein the electrohydraulic partial brake system includes a first pressure sensor for determining a hydraulic pressure generated by way of the master cylinder and/or a motor position sensor for determining a motor position of a drive of the electromechanical pressure provision device and/or a displacement sensor for determining a displacement travel of a cylinder piston in the master cylinder.

8. The brake system as claimed in claim 2, wherein the second control unit is configured to actuate the electromechanical pressure provision device in order to generate a hydraulic brake pressure by way of the electromechanical pressure provision device in a manner which is dependent on a determined displacement travel of the cylinder piston in the master cylinder and/or in a manner which is dependent on a hydraulic pressure generated by way of the master cylinder and/or in a manner which is dependent on an actuating angle of the actuating pedal and/or in a manner which is dependent on an actuating travel of the actuating pedal and/or in a manner which is dependent on a force which acts on the actuating pedal.

9. The brake system (100) as claimed in claim 1, wherein the electrohydraulic partial brake system includes a pressure modulation apparatus, the pressure modulation apparatus being configured to modulate the hydraulic brake pressure prevailing at the hydraulically actuated wheel brakes in a wheel-individual manner, the first control unit being configured to control the pressure modulation apparatus.

10. The brake system as claimed in claim 1, wherein the electromechanically actuated wheel brakes are supplied with energy by the first energy supply.

11. The brake system as claimed in claim 1, wherein the first control unit is configured to determine setpoint brake forces to be applied by way of the electromechanically actuated wheel brakes in a manner which is dependent on a determined displacement travel of the cylinder piston in the master cylinder and/or in a manner which is dependent on a hydraulic pressure generated by way of the master cylinder and/or in a manner which is dependent on an actuating angle of the actuating pedal and/or in a manner which is dependent on an actuating travel of the actuating pedal and/or in a manner which is dependent on a force which acts on the actuating pedal.

12. The brake system as claimed in claim 1, further comprising wheel rotational speed sensors, wherein the first control unit is configured to modulate the brake forces prevailing at the vehicle wheels on the basis of the wheel rotational speeds.

13. The brake system (100) as claimed in claim 1, wherein the first control unit is connected to a vehicle bus of the motor vehicle, it being possible for control commands, in particular brake requests, to be transmitted to the first control unit via the vehicle bus.

* * * * *